(12) United States Patent
Allen et al.

(10) Patent No.: US 7,752,578 B2
(45) Date of Patent: Jul. 6, 2010

(54) AUTOMATIC VOLTAGE DROP OPTIMIZATION

(75) Inventors: David L. Allen, Fremont, CA (US); Christopher W. Kapral, Austin, TX (US)

(73) Assignee: Apache Design Solutions, Inc., San Jose, CA (US)

( * ) Notice: Subject to any disclaimer, the term of this patent is extended or adjusted under 35 U.S.C. 154(b) by 539 days.

(21) Appl. No.: 11/551,149

(22) Filed: Oct. 19, 2006

(65) Prior Publication Data

US 2008/0098335 A1    Apr. 24, 2008

(51) Int. Cl.
*G06F 17/50* (2006.01)

(52) U.S. Cl. .................. 716/2; 716/7; 716/8; 716/9

(58) Field of Classification Search .................. 716/2, 716/7–9
See application file for complete search history.

(56) References Cited

U.S. PATENT DOCUMENTS

| | | | | |
|---|---|---|---|---|
| 5,119,169 | A * | 6/1992 | Kozono et al. | 257/369 |
| 5,391,900 | A * | 2/1995 | Onodera et al. | 257/207 |
| 5,598,348 | A * | 1/1997 | Rusu et al. | 716/2 |
| 6,115,279 | A * | 9/2000 | Kitsukawa et al. | 365/63 |
| 6,480,989 | B2 * | 11/2002 | Chan et al. | 716/8 |

* cited by examiner

*Primary Examiner*—Sun J Lin
(74) *Attorney, Agent, or Firm*—Haynes and Boone, LLP (57) ABSTRACT

To minimize the voltage drops in an electronic circuit, existing instances are moved and decoupling capacitors are automatically inserted according to an algorithm. A model of the voltage drop on a row of gate elements is presented. The model allows for rapid computations of the effect of a particular move or insertion on voltage drop in the circuit.

17 Claims, 5 Drawing Sheets

| Pre-operation | (101) | | | | |
|---|---|---|---|---|---|
| Source sub-row | (111): | $V_{S1, old}$ | $V_{S2, old}$ | $\cdots$ $V_{S(M-1), old}$ | $V_{SM, old}$ |
| Target sub-row | (112): | $V_{T1, old}$ | $V_{T2, old}$ | $\cdots$ $V_{TN, old}$ | |
| Post-operation | (102) | | | | |
| Source sub-row | (121): | $V_{S1, new}$ | $V_{S2, new}$ | $\cdots$ $V_{S(M-1), new}$ | |
| Target sub-row | (122): | $V_{T1, new}$ | $V_{T2, new}$ | $\cdots$ $V_{TN, new}$ | $V_{T(N+1), new}$ |

AUTOMATIC VOLTAGE DROP OPTIMIZATION

FIELD OF THE INVENTION

The present invention relates to electronic design automation (EDA) for electronic circuits. In particular, the present invention relates to an EDA tool for automatic optimization of voltage drop based on a circuit description.

BACKGROUND OF THE INVENTION

Lower supply voltages in today's integrated circuits have increased the need to reduce unwanted voltage drops in a circuit. These voltage drops are caused by the non-negligible resistivity of circuit components like metal interconnect and Ohm's law, which dictates that the voltage drop across a component is equal to the current times the resistance (V=IR). Thus, it has become increasingly important to accurately and efficiently compute and model the voltage drops in a circuit, and to optimally place circuit components to reduce voltage drops.

Existing methods, however, have proven computationally inefficient. In particular, existing methods require circuit simulation at the layout level to estimate the voltages drops resulting from moving or inserting components in the circuit. Such simulations take time, and do not facilitate optimizing circuit component to minimize voltage drop. It would thus be desirable to provide a method for modeling voltage drops that is both accurate and easy to compute, and which automatically determines the optimal circuit component placement to reduce voltage drops.

SUMMARY OF THE INVENTION

The present invention provides an optimization tool for minimizing unwanted voltage drops in an integrated circuit (IC), which are caused by the non-negligible resistivity of circuit components such as metal interconnects. The tool receives a gate-level circuit representation, along with placement and input voltage drop information. It decomposes the circuit into a number of sub-rows, builds a simple computational model for each sub-row, and then optimizes circuit component placement in the sub-row. The procedure comprises identifying, based on the computational model, possible voltage drop-reducing changes that can be made to the circuit component placement, such as moving current sinks to alternative positions, or introducing decoupling capacitors (decaps) in the circuit. The most effective change is then selected from the identified changes, based on the voltage drop and the cost of replacement, and implemented. The optimization procedure continues until either the target voltage drop is reached, or when the voltage drop cannot be further improved.

DETAILED DESCRIPTION OF THE PREFERRED EMBODIMENT

In the following description, reference is made to the accompanying drawings which illustrate several embodiments of the present invention. The following detailed description is not to be taken in a limiting sense, and the scope of the embodiments of the present invention is defined only by the claims of the issued patent.

Step 1: Sub-row Decomposition

Figure 1:
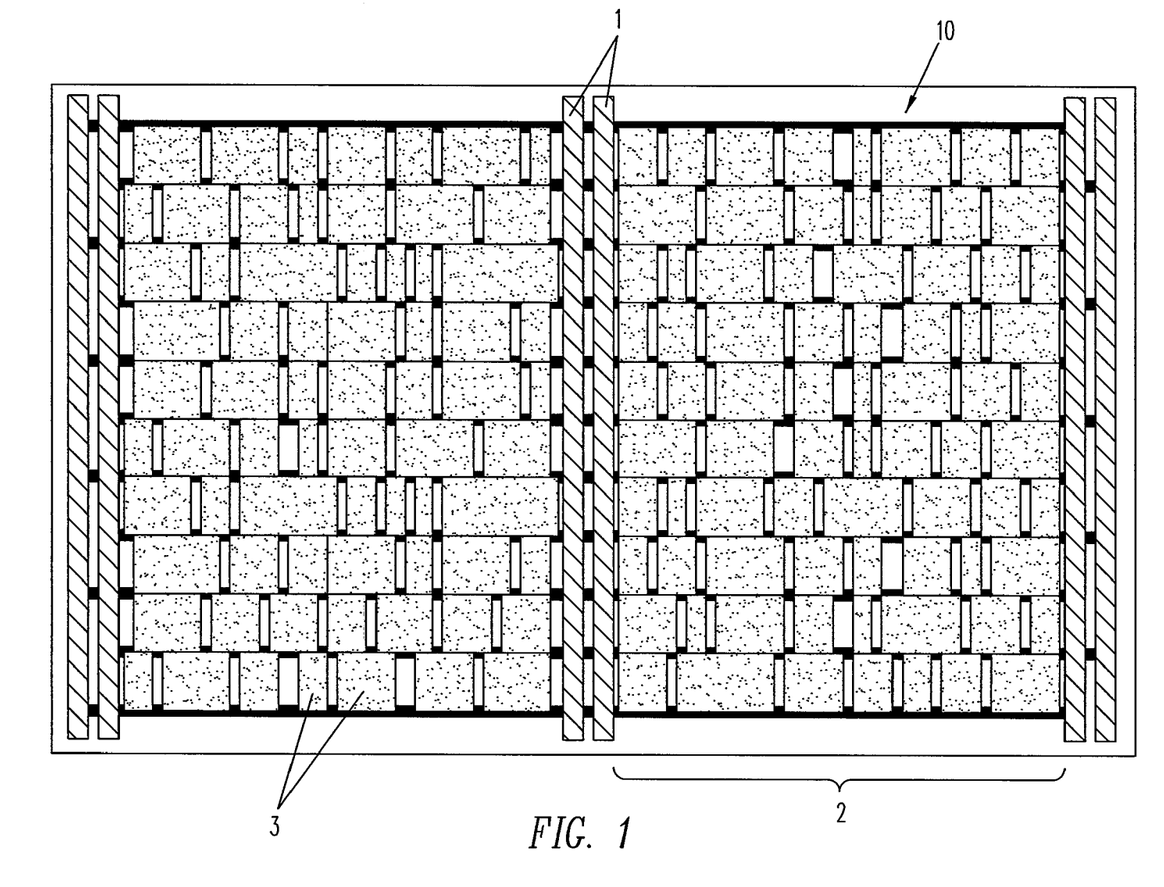
FIG. 1 shows sub-row decomposition.
Figure 2:
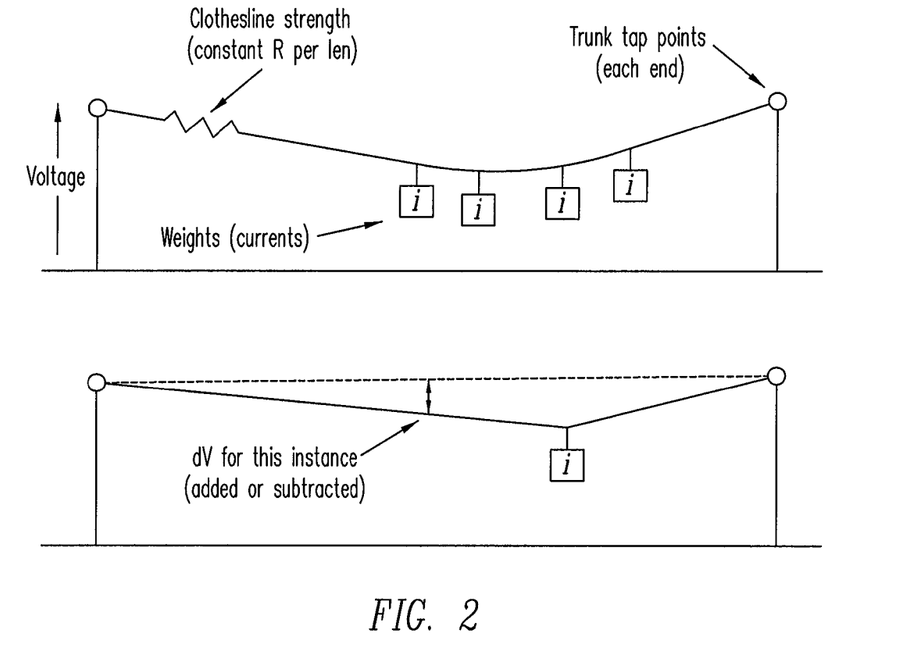
FIG. 2 shows the computational model of a sub-row.

Referring now to FIG. 1, an IC (10) includes horizontal rows of circuit component instances, which may be modeled as current sinks (3), and vertical metal power trunks (1). These circuit component instances draw current from one or more power supply circuits and ground. According to one embodiment of the present invention, the gate-level representation of the IC is first decomposed into a set of sub-rows (2). The decomposition step breaks each row at each point of intersection with a power trunk. Therefore, in general, each sub-row contains a number of horizontally adjacent current sinks with a trunk at each end, except in some instance, some sub-rows may not have a trunk at one end. The trunks may supply either a power voltage or a ground voltage, and the trunks generally (but not always) occur in pairs.

In one embodiment of the invention, an algorithm can be provided that identifies each intersection between a row and a power/ground trunk in the circuit. For each intersection n, the algorithm considers whether the intersection n+1 located immediately right of the current intersection is within a certain distance. If so, a sub-row can be formed, with the intersection n and the intersection n+1 defining the two ends of the sub-row. After each intersection is considered, if there are still intersections that have not been paired off with other intersections, then each of the remaining intersections is assigned its own sub-row. A remaining intersection forms one end of such a sub-row, and the portion of the row to the right of that intersection forms another sub-row.

At the conclusion of this procedure, a sub-row may have a trunk at both ends, or at one end only. If a row has a trunk at neither end, then the row appears to be disconnected from the main power distribution. This is flagged as an error.

Step 2: Model Creation

After the sub-rows are formed, a simple computational model of each sub-row is provided. Qualitatively, the computational model is analogous to a model of a clothesline. A sub-row can be supported at its ends by two power trunks, analogous to two poles holding up a clothesline. Each current sink draws a certain amount of current from a power bus line running horizontally from one or both of the power trunks, analogous to an item weighing down the clothesline by its weight. The horizontal power bus in the sub-row has a certain resistance per unit length, analogous to the strength of the clothesline. The voltage drop at each point in the sub-row is analogous to the vertical "sag" in the clothesline. The sag of the clothesline when only a single weight is present can be easily computed, and the sag of the clothesline with multiple weights is the superposition of the individual sags.

Figure 4:
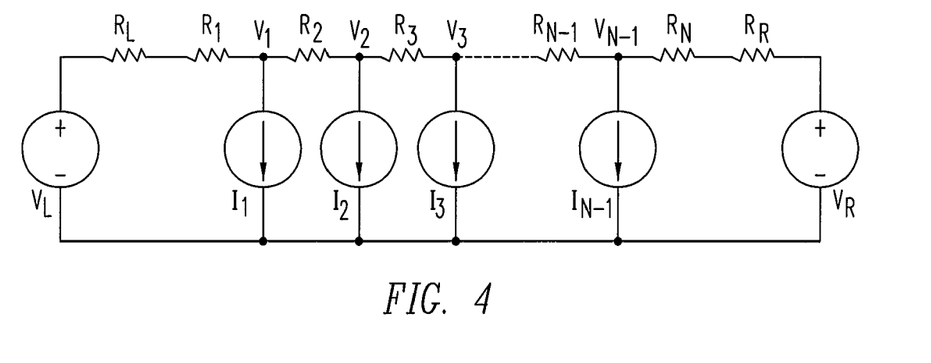
FIGS. 4-9 are circuit diagrams that illustrate how voltage drops are modeled according to the present invention.

The computational model will now be quantitatively described in detail. In general, power is distributed to a circuit by a power distribution tree. In such a scheme, a main power line feeds a set of power lines at a lower level, the lower power lines each feed their own set of power lines at an even lower level, and so on. As shown in FIG. 4, a sub-row consists of a row of cells or instances, modeled as current sinks $I_1, I_2, I_3 \ldots I_{N-1}$, that are driven by a pair of power trunks $V_L$ and $V_R$ on the lowest level of a power distribution tree. The power trunks supply current to each current sink $I_i$ on the associated sub-row. The voltage drop at each current sink $V_1 V_2, V_3 \ldots V_{N-1}$ depends on the power source resistances $R_L$ and $R_R$, the bus resistances, $R_1 \ldots R_N$, as well as the amount of current drawn by the surrounding current sinks. In general, the voltages would be highest at the sub-row ends near the power trunks, and lowest at some point within the sub-row.

Note that every current sink is in fact connected to a power trunk via both a power bus and a ground bus, and thus there are resistances and voltage drops associated with both the power bus (resistances shown in FIG. 4) and the ground bus (resistances not shown in FIG. 4). In this analysis, the voltage drop associated with the ground bus for each current sink is assumed roughly the same as the voltage drop associated with the power bus, and can be incorporated into the model by simply doubling the associated resistances of the power bus. However, it will be understood that the present invention encompasses models that separately account for the ground and power voltage drops.

To compute the voltage drops $V_1, V_2, V_3 \ldots V_{N-1}$ at each node, the superposition principle for linear systems can be applied. This principle states that the total voltage drop at a particular node equals the sum of the voltage drops contributed to that node by each particular current sink. Using this principle, the total voltage drop at a node I (note that the letter "I" without a subscript herein refers to a particular node, whereas the letter "I" with a subscript such as "$I_1$" refers to the current associated with a particular current sink) when there are multiple current sinks $I_1, I_2, I_3 \ldots I_{N-1}$ can be broken down by considering the voltage drop $\Delta V_i$ contributed by each current sink $I_i$:

$$V_I = \Sigma_{all\ i} \Delta V_i$$

Figure 5:
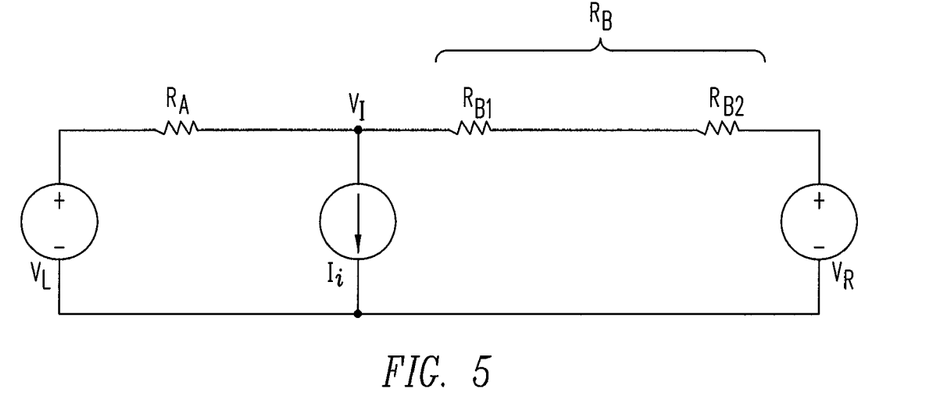

FIG. 5 shows how an individual voltage drop $\Delta V_i$ can be calculated for the current sink $I_i$ that is directly connected to the node I:

$$\Delta V_i = I_i * (R_A \| R_B)$$
$$= I_i * R_A * R_B / (R_A + R_B)$$

where:

$$R_A = R_L + R_1 + R_2 + \ldots + R_i$$

$$R_B = R_{B1} + R_{B2} = R_{i+1} + R_{i+2} + \ldots + R_N + R_R$$

Figure 6:
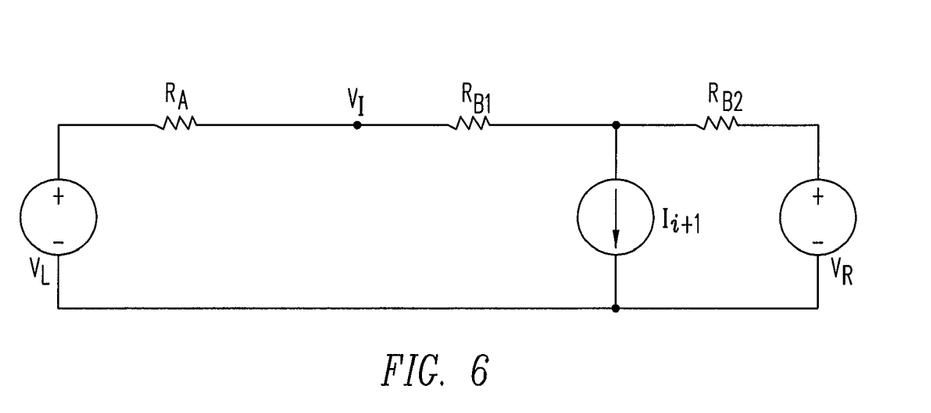

Similarly, FIG. 6 shows how an individual voltage drop $\Delta V_{i+1}$ (i.e., the contribution to the total voltage at node I from the current sink $I_{i+1}$) can be calculated for a current sink that is separated from the node I by a resistance $R_{B1}$:

$$\Delta V_{i+1} = I_{i+1} * R_{B2} * R_A / (R_A + R_{B1} + R_{B2})$$

where $$R_A = R_L + R_1 + R_2 + \ldots + R_i$$

$$\Delta V_{i+1} = I_{i+1} * R_{B2} * (R_A + R_{B1}) / (R_A + R_{B1} + R_{B2})$$

$$R_{B2} = R_{i+2} + \ldots + R_N + R_R$$

Figure 7:
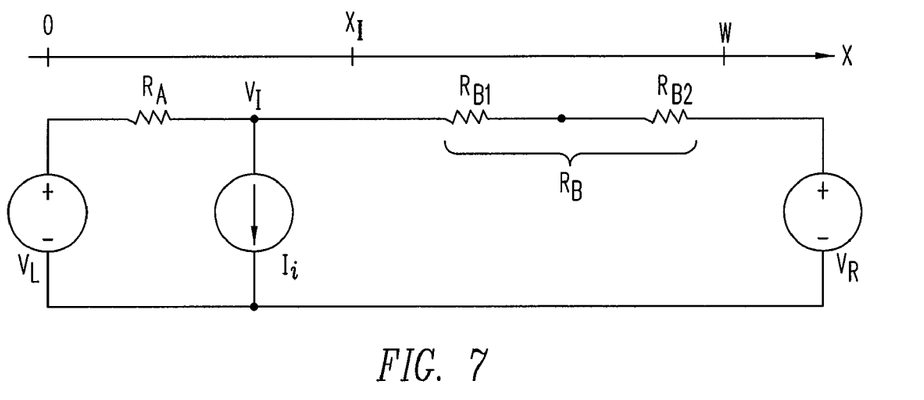

Since the resistivity of a power bus is assumed uniform along the length of a sub-row, the equations given above can be further simplified by characterizing each resistance in terms of a parameter $X_I$ that represents the horizontal length of power bus between a power trunk and a node I, as shown in FIG. 7. If we define a constant resistivity R (per unit length) for a power bus, we have, ignoring the source resistances $R_L$ and $R_R$:

$$R_A = X_I * R$$

$$R_B = (W - X_I) * R$$

Substituting these into the equation given for FIG. 5 above, we have:

$$\Delta V_i = I_i * R * X_I * (W - X_I) / W$$

Figure 8:
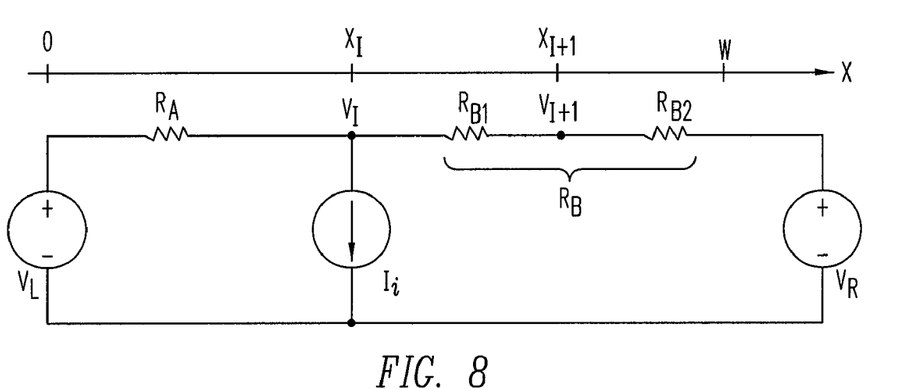

FIG. 8 illustrates the case of distributed resistance for a current sink that is separated from the node I by a resistance $R_{B1}$, which is similar to the discrete resistance case shown in FIG. 6. The resistance values are:

$$R_A = X_I * R$$

$$R_{B1} = (X_{I+1} - X_I) * R$$

$$R_{B2} = (W - X_{I+1}) * R$$

In analogy to the equations for FIG. 6 given above, the individual voltage drop contribution $\Delta V_{i+1}$ can be calculated as:

$$\Delta V_{i+1} = I_i * R * X_I * (W - X_{I+1}) / W, (X_{I+1} >= X_I)$$

or $$\Delta V_{i+1} = I_i * R * X_{I+1} * (W - X_I) / W, (X_I >= X_{I+1})$$

Figure 9:
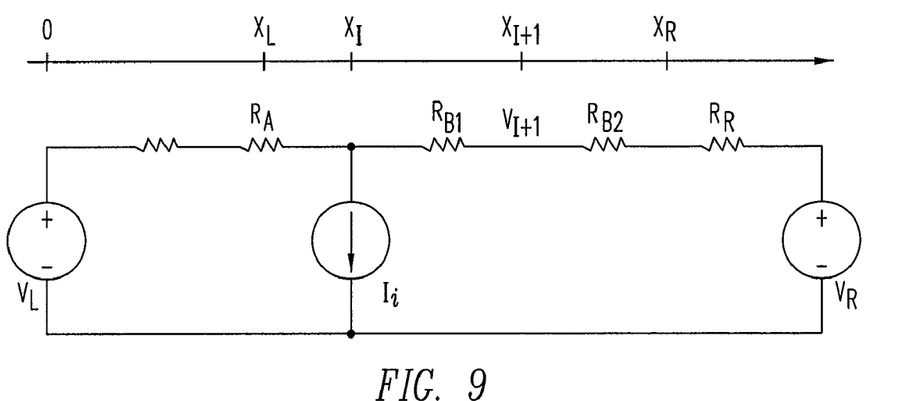

This simplified analysis has ignored the source impedance of the left- and right-hand trunks and the x coordinate of the left end of the sub-row. Incorporating these sources resistances in FIG. 9, the total expressions for the voltage drops $\Delta V_i$ are:

$$\Delta V_{i+1} = I_i * [R_L + (X_I - X_L) * R] * [$$
$$R_R + (X_R - X_{I+1}) * R] / [R_L + R_R + (X_R - X_L) * R], (X_{I+1} >= X_I)$$

or $$\Delta V_{i+1} = I_i * [R_L + (X_{I+1} - X_L) * R] * [$$
$$R_R + (X_R - X_I) * R] / [R_L + R_R + (X_R - X_L) * R], (X_I >= X_{I+1})$$

Note that the endpoint voltages $V_L$ and $V_R$ do not appear in the above expressions. This is because we are calculating the voltage difference resulting from the change in current. The effect of $V_L$ and $V_R$ is already incorporated into the initial voltage, and the superposition principle allows us to add the voltage difference to the initial voltage.

As earlier mentioned, the value of R for these calculations is based on the resistance per unit length technology parameter for the power bus. In the single-ended analysis given here, the power and ground bus resistances are effectively in series, so R can be double the value from the technology file.

Step 3: Placement Adjustment Operation Generation

Figure 3:
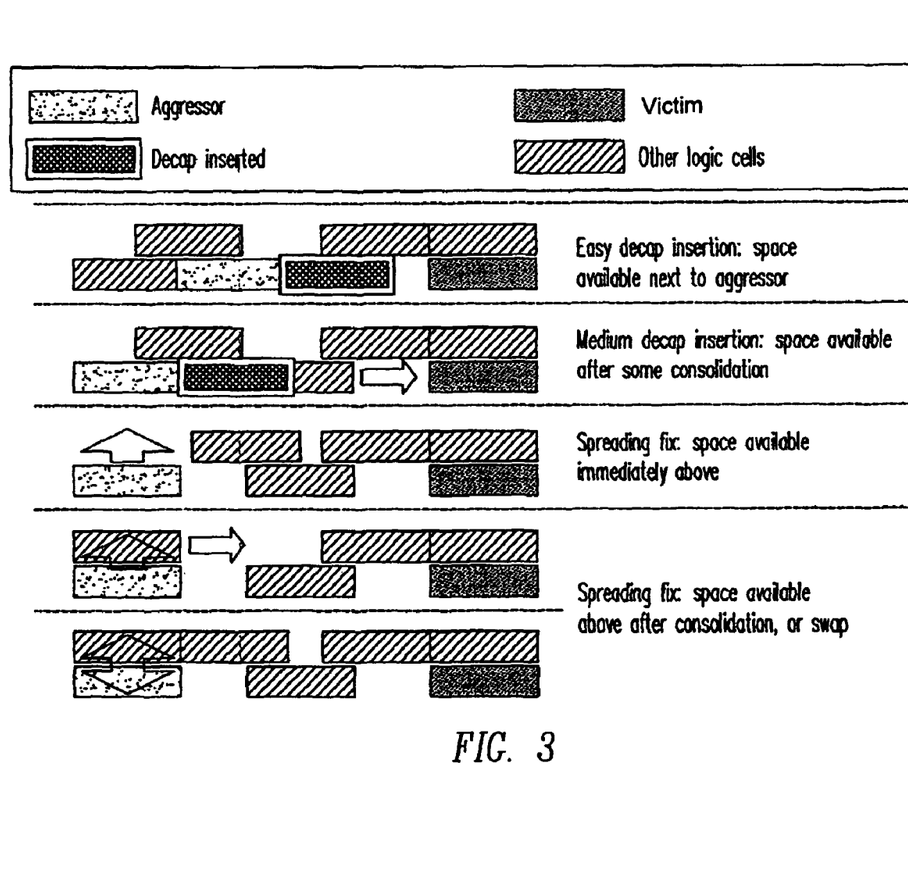
FIG. 3 shows the operations generated in step 3.

The third step according to one embodiment of the present invention is placement adjustment operation generation. In this step, a list of possible alternative placements for the instances is systematically generated. First, the current sink which currently experiences the worst voltage drop is chosen as a candidate for re-placement. For illustrative purpose herein, this current sink is called the "victim". On the same sub-row, there are also many other current sinks which draw current. For illustrative purpose herein, the largest such current sink is called the "aggressor". According to one embodiment of the invention, there are four possible operations that may decrease the voltage drop. These operations are: 1) moving the aggressor to another sub-row, 2) moving the victim to another sub-row, 3) inserting a decoupling capacitor ("decap") next to the aggressor, and 4) inserting a decap next to the victim. FIG. 3 illustrates how these possibilities may be implemented.

In the case of the first two possible operations, namely, moving an aggressor or victim current sink to another sub-row, a search algorithm is used to find possible destinations. The algorithm considers every current sink within a range of the source current sink. The range searched may be over an area having a diamond shape. The height of the diamond may be a small number of rows, such as 5 rows. The width of the diamond may be a small number of current sink widths, such as 20 microns. Each current sink in the diamond is considered a possible target for a possible "swapping" operation.

In addition to "swapping" a source current sink with a target current sink, the algorithm also considers whether fragmented space on a candidate row can be consolidated to make room for the source current sink. In this case, the algorithm will determine the sequence of moves that need to be performed, and associate this sequence with the particular candidate operation.

At the end of Step 3, the algorithm has generated a list of candidate operations. In the next step, the algorithm will evaluate the cost and benefit of each of these candidate operations.

Step 4: Operation Evaluation

The fourth step is operation evaluation. In general, this step evaluates each candidate operation obtained in the previous step to determine the resulting effect on voltage drop, as well as the cost that would be incurred in executing the operation. In particular, this step comprises four sub-steps: 1) computing the placement cost for each candidate operation, 2) given more than one candidate operation targeting the same sub-row, pruning the list to keep only the operation with the lowest placement cost for each sub-row, 3) for each affected sub-row, updating the voltage drop values corresponding to the sub-row, and 4) computing the voltage drop benefit for each candidate operation.

Sub-step 1) calculates a placement cost associated with each candidate operation by summing together the placement cost of each individual movement of a current sink in a particular candidate operation. For example, the cost of each movement may be deemed proportional to the total distance that a current sink is displaced. The cost may also be deemed proportional to variables corresponding to each current sink pin above 2, a "soft fixed" attribute on the current sink, or a negative timing slack number on the current sink.

In sub-step 2), the algorithm prunes the list of candidate operations by considering candidate operations targeting the same sub-row, and keeping only the operation with the lowest placement cost. By doing so, the list may be reduced to at most one candidate operation per sub-row.

In sub-step 3), the algorithm models the effect of a candidate operation on the voltage drop of each instance in the affected sub-rows. For a given circuit, an array is defined that contains an entry for each sub-row in the circuit. For each sub-row in that array, a sub-array is defined containing an entry for each current sink in that sub-row. The voltage drop of each current sink in the circuit is maintained in the entries of the sub-array. If a current sink is removed from a sub-row, the voltage drop on that sub-row improves; and the voltage drops for all the sub-array entries corresponding to that sub-row are updated. In particular, the clothesline shape for the removed current source is subtracted from each sub-array entry of that sub-row. On the other hand, if a current sink is added to a sub-row, the clothesline shape for the added current source is added to the sub-array entries in that row. Similar calculations are performed to model the operation of adding a decap. For example, in one embodiment, when adding a decap, the average power requirement may be modeled, for example, as being proportional to the capacitance and the square of the supply voltage. The average current may be computed from the average power.

Figure 10:
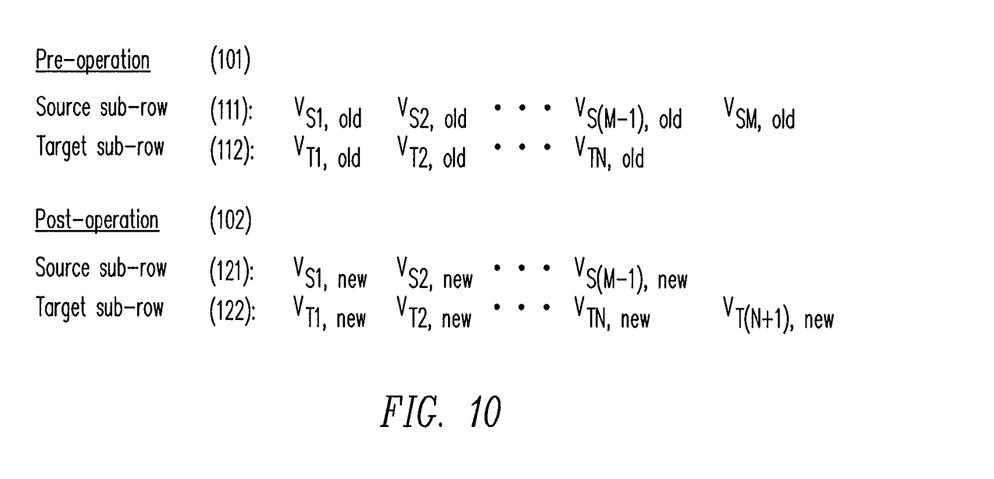
FIG. 10 shows an embodiment of the present invention wherein the voltage drop values are computed using arrays.

FIG. 10 shows an example of the arrays of voltage drops that are stored for computation. The pre-operation array (101) shows the voltage drops before a candidate operation is implemented, and comprises a series of entries for the source sub-row (111) and the target sub-row (112). The source sub-row (111) corresponds to the sub-row that contains the source current sink to be moved. The target sub-row (112) corresponds to the sub-row to which the source current sink would be transferred if the candidate operation were implemented. The source sub-row (111) contains a series of voltage drops $V_{S1,old}, V_{S2,old}, \ldots, V_{S(M-1),old}, V_{SM,old}$ that correspond to the voltage drop at each individual instance of the source sub-row. Similarly, the target sub-row (112) contains a series of voltage drops $V_{T1,old}, V_{T2,old}, \ldots, V_{TN,old}$ that correspond to the voltage drop at each individual instance of the target sub-row. Note that the voltage drop as defined here is a generally a positive value—the object of the invention is to decrease the voltage drops in the circuit.

In the notation for the voltage drops, a first subscript "S" signifies that the voltage drop corresponds to a source sub-row, while a first subscript "T" signifies that the voltage drop corresponds to a target sub-row. The second subscript is a number that indexes the particular instance within the sub-row. For the source sub-row, the index runs from 1, corresponding to the first instance in the sub-row, to a number M, corresponding to the last instance of the source sub-row. For the target sub-row, the index runs from 1 to a number N, corresponding to the last instance of the target sub-row. Finally, the subscript "old" signifies that the variable is the voltage drop before the candidate operation is implemented, while a subscript "new" represents the voltage drop after the candidate operation is implemented.

The post-operation array (102) shows the effect on the voltage drops of implementing a particular candidate operation. In the case illustrated, the particular candidate operation comprises moving a victim current sink corresponding to $V_{SM,old}$ from the source sub-row to the target sub-row. As a result of this operation, the source sub-row has lost an entry $V_{SM,old}$, while the target sub-row has gained an entry $V_{T(N+1),new}$, as shown in the post-operation source sub-row (121) and target sub-row (122).

Next, sub-step 4) calculates some statistics for each candidate operation based on the arrays formed in sub-step 3). First, the difference $V_{T(N+1),new} - V_{SM,old}$ is calculated. This difference is termed the "voltage drop change," and corresponds to the change in voltage drop experienced by the current sink that was previously located on the source sub-row ($V_{SM,old}$, now located on the target sub-row ($V_{T(N+1),new}$) according to the candidate operation. If the voltage drop change is negative, meaning that the voltage drop has decreased, then the candidate operation has produced a voltage benefit. The voltage drop change is saved for further processing in Step 5. In addition, the algorithm utilizes a parameter known as the voltage drop goal threshold, which defines the maximum tolerable voltage drop in the circuit. The algorithm examines each instance in the source and target sub-rows and considers whether, for any instance, $V_{old}$<voltage drop goal threshold and $V_{new}$>voltage drop goal threshold. If this is true, then the candidate operation would generate additional voltage drop violations for some instance or instances. This information is also saved for further processing in Step 5.

While the array in FIG. 10 illustrates the operation of moving a victim current sink to another row, a similar operation can be applied to other operations such as moving an aggressor current sink, or inserting decaps into the circuit.

To summarize, sub-step 1) assigns each candidate operation a placement cost. In sub-step 2), of the candidate operations targeting the same sub-row, only the operation with the lowest placement cost is kept, and the others are discarded. In sub-step 3), arrays of voltage drops are formed for computation. In sub-step 4), each candidate operation is assigned a computed voltage drop change, as well as an indication of whether additional voltage drop violations would be committed.

Step 5: Operation Implementation

The final step is operation implementation. In Step 4, the placement and voltage drop of each candidate operation was computed, along with an indication of whether, after the candidate operation is carried out, whether a voltage drop violation would exist in the source and target sub-rows. In Step 5, the list of candidate operations is sorted, in order of increasing voltage drop change. In other words, the candidate operation providing the greatest voltage benefit is ranked highest. Candidate operations that would create a voltage drop violation are immediately discarded. Of the remaining operations, the highest-ranked candidate operation is then chosen for implementation, on condition that this candidate operation has an associated placement cost less than a certain threshold. For the chosen operation, each move required to implement that operation as identified in Step 3 is committed to the placement database, and the voltage drop associated with each affected current sink is updated.

In case the placement cost of the highest-ranked candidate operation exceeds the threshold, then the next highest-ranked operation is considered. This operation will have lower voltage benefit, but may have an acceptable placement cost. If the list of proposed operations is empty, or all of the moves exceed the placement cost threshold, then the invention will loop back to Step 3 and consider the current sink with the next highest voltage drop. If a complete traversal of all current sinks is made without finding any acceptable operations, then the invention terminates. In general the invention will continue fixing voltage drop violations until the entire design is free of voltage violations.

Thus Steps 3-5 are repeated until the voltage drop reaches a target level, or until step 5 fails to find any operations which improve the voltage drop.

Note that various modifications to the embodiments disclosed herein are possible within the scope of the present invention.

What is claimed is:

1. A method for placement of gate-level circuit components in an integrated circuit, the integrated circuit comprising a plurality of rows of circuit blocks, each row of circuit blocks comprising a plurality of sub-rows of circuit blocks, the method comprising:

identifying a first sub-row of the integrated circuit comprising a bus and a first instance of a gate-level circuit component;

identifying at least one candidate operation to apply to the first sub-row, wherein the candidate operation affects a placement of a circuit block or a component in the first sub-row;

computing a first metric to evaluate each of said at least one candidate operation when applied to the first sub-row; and implementing one of said at least one candidate operation based on the computed first metric, wherein at least one or more of the identifying steps, the computing or the implementing steps are carried out by a computer.

2. The method of claim 1, wherein the first sub-row further comprises a trunk for supplying a power or ground voltage.

3. The method of claim 2, wherein the first sub-row comprises a trunk for supplying a power voltage, and a trunk for supplying a ground voltage.

4. The method of claim 1, wherein one of the at least one candidate operation is adding a decoupling capacitor to the first sub-row.

5. The method of claim 1, wherein one of the at least one candidate operation is moving the first instance to a second sub-row.

6. The method of claim 5, wherein the moving of the first instance to a second sub-row further comprises moving at least one instance on the second sub-row to make space for the first instance.

7. The method of claim 6, wherein the second sub-row is separated from the first sub-row by no more than a threshold distance.

8. The method of claim 1, wherein the identifying a first sub-row comprises:

identifying a first intersection between the bus and a first trunk for supplying a power or ground voltage;

identifying a second intersection between the bus and a second trunk for supplying a power or ground voltage; and wherein the first sub-row further comprises the first intersection and the second intersection.

9. The method of claim 8, wherein the second intersection is required to be less than a predetermined distance from the first intersection.

10. The method of claim 1, wherein the first sub-row further comprises a second instance, and one of the at least one candidate operation is moving the second instance to a second sub-row.

11. The method of claim 1, wherein the first metric is a voltage drop change.

12. The method of claim 11, wherein computing the voltage drop change comprises subtracting: 1) a voltage drop corresponding to the first instance before performing the candidate operation, from 2) a voltage drop corresponding to the first instance after performing the candidate operation.

13. The method of claim 12, wherein the implementing one of said at least one candidate operation comprises:

selecting the candidate operation having the most negative voltage drop change from among the at least one candidate operation; and implementing the selected candidate operation.

14. The method of claim 13, wherein the first sub-row comprises a second instance, and one of the at least one candidate operation is moving the second instance to a second sub-row, said method further comprising:

for each candidate operation, computing a voltage drop change for each instance in the first and second sub-row;

identifying a second candidate set comprising candidate operations for which each instance in the first and second sub-row have a computed voltage drop change less than a voltage drop goal threshold; and selecting the candidate operation having the most negative voltage drop change from the second candidate set.

15. The method of claim 14, further comprising computing a second metric for each of said at least one candidate operation, wherein the implementing one of said at least one candidate operation is further based on the computed second metric.

16. The method of claim 15, wherein the second metric is a placement cost.

17. The method of claim 14, wherein the implementing of one of said at least one candidate operation comprises:

identifying a first candidate set comprising candidate operations having a placement cost less than a placement cost threshold;

selecting the candidate operation having the most negative voltage drop change from the first candidate set; and implementing the selected candidate operation.

* * * * *